US006476375B1

(12) United States Patent
Nicoud et al.

(10) Patent No.: US 6,476,375 B1
(45) Date of Patent: *Nov. 5, 2002

(54) OPTICAL SENSOR FOR POINTING DEVICE WITH CONICAL DISKS AND SINGLE PHOTODETECTOR

(75) Inventors: Jean-Daniel Nicoud, Belmont; René Sommer, Renens; Marc A. Bidiville, Pully, all of (CH)

(73) Assignee: Logitech Europe, S.A. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,817

(22) Filed: Jan. 10, 2000

Related U.S. Application Data

(63) Continuation-in-part of application No. 09/310,694, filed on May 5, 1999, now Pat. No. 6,300,620.

(51) Int. Cl.[7] .................................................. G09G 5/00
(52) U.S. Cl. ................... 250/221; 250/231.13; 345/165
(58) Field of Search .............................. 250/221, 222.1, 250/231.13, 231.14, 231.15, 231.16, 206.1; 345/163, 165, 166, 167

(56) References Cited

U.S. PATENT DOCUMENTS

| 4,920,259 A | * | 4/1990 | Epstein ................... 250/231.13 |
| 5,434,594 A | * | 7/1995 | Martinelli et al. ........... 345/163 |
| 5,559,534 A | * | 9/1996 | Lin ............................. 250/221 |

FOREIGN PATENT DOCUMENTS

JP             08-95706 A   *  4/1996

* cited by examiner

Primary Examiner—Kevin Pyo
(74) Attorney, Agent, or Firm—Townsend and Townsend and Crew LLP

(57) ABSTRACT

A method and apparatus for eliminating at least one light emitter and one light detector in a mouse design. This is done by using two conical shaped encoder wheels positioned so that they are almost touching each other. A single light emitter then is used to shine light at the junction, so that it strikes both cones. Adjacently located is a single chip, with two photodetectors integrated on each side. The chip is positioned so that light directed at the first conical encoder impinges on the first group of photodetectors, while light directed at second conical encoder impinges on the second group of photodetectors. Thus, the two photodetectors can be integrated on a single chip, saving a separate photodetector chip. In addition, only a single LED is required.

21 Claims, 4 Drawing Sheets

OPTICAL SENSOR FOR POINTING DEVICE WITH CONICAL DISKS AND SINGLE PHOTODETECTOR

This application is a continuation in part ("CIP") of application Ser. No. 09/310,694, filed May 05,1999, now U.S. Pat. No. 6,300,620, for OPTICAL SENSOR FOR POINTING DEVICE WITH CONICAL DISKS AND SINGLE PHOTODETECTOR.

BACKGROUND OF THE INVENTION

The present invention relates to optical sensors for pointing devices, such as mice and trackballs. In particular, it relates to the reduction of the number of components.

Typically, mice and trackballs have a ball which is either rolled across a desktop when a user moves the mouse, or is manipulated with a user's finger for a trackball. This motion is detected in both the x and y directions by the use of two rollers which are biased against the ball inside the device. The rollers are offset from each other at an angle of 90°. Each roller will typically have a shaft connected to an encoder wheel, which is a wheel with a number of slots. A light emitter, such as a light emitting diode (LED) is mounted on one side of each encoder wheel, with one or more photodetectors on the other side. Multiple photodetectors may be used for differential detection. When the encoder wheel turns, light alternately passes through the slots, and is blocked by the encoder wheel, allowing a determination of the amount of movement of the ball in the x or y direction.

Newer mice and track balls will sometimes include a separate roller wheel which the user can manipulate for scrolling. Such a roller wheel is typically also connected to a separate encoder wheel, which also has an emitter and a detector on either side for determining its movement.

Another typical input for mice and trackballs is one or more buttons to indicate a clicking function. The buttons are typically spring biased to allow the user to depress them, and then have them pop back up. The buttons will typically depress a microswitch mounted beneath the button to provide an input signal. Each button typically has its own microswitch.

One of the challenges in the design of such pointing devices is the reduction of costs and reductions in size, or fitting additional functionality in the same size device. One obvious way to reduce costs is to reduce the number of components required to build the mouse or trackball or other pointing device.

SUMMARY OF THE INVENTION

The present invention provides a method and apparatus for eliminating at least one light emitter and one light detector in a mouse design. This is done by using two conical shaped encoder wheels positioned so that they are almost touching each other. A single light emitter then is used to shine light at the junction, so that it strikes both cones. Adjacently located is a single chip, integrating two groups of photodetectors. The chip is positioned so that light directed at the first conical encoder impinges on the first group of photodetectors, while light directed at the second conical encoder impinges on the second group of photodetectors. Thus, the two photodetectors can be integrated on a single chip, saving a separate photodetector chip. In addition, only a single LED is required.

In a preferred embodiment, encoder wheels are connected to rollers which contact the ball at 90°. The encoders are conically shaped with a cone angle of 45°. The semiconductor chip with the photosensors is mounted in the vertical plane tangent to both conical shaped encoders. The encoders alternately block and let light pass through as they rotate with their respective roller. This embodiment is referred to as a transmissive embodiment, since light passes through the encoders.

In an alternate embodiment, conical shaped encoders having a reflective surface, instead of the slots used in the more typical transmissive encoders, are used. In this alternate embodiment, the conical encoder selectively reflects light directed at it, by the LED placed in front of it, to a detector which is also placed in front of the conical encoder disk-the same side as the LED. In this embodiment, the detector can be placed on the PCB in the vertical plane, tangent to both conical shaped encoders, or it can be mounted at any angle ranging from horizontally flat to vertical on the PCB, or at any angle in this range relative to reflected light to adequately receive the reflected light.

The primary advantage of the reflective scheme over a transmissive one in the present invention is the reduction in interference between non-encoded and encoded light. Non-encoded light is direct light from the LED, and encoded light is light after it has interacted with the encoder disk. In a transmissive system, the potential does exist for the photodetector to receive non-encoded light, —i.e. light that goes directly from the LED to the photodetector, and hence introduce inaccuracies in coordinate detection. Ideally, the photodetector should receive nothing but encoded light. The inaccuracies are introduced because the non-encoded light decreases the amplitude of the modulated signals. As the signal amplitude or the signal quality is reduced, it gets more difficult and more expensive to detect each light pulse. The reflective scheme, by not placing the photodetector in the direct path of the LED, aims to ensure that the photodetector sees only encoded light. Thus, the reflective scheme reduces optical interference between non-encoded and encoded light, and hence improves the detection accuracy of the device. Another advantage of the reflective system is that the encoder disks have no slots, and are therefore easier and less costly to mold.

In yet another alternate embodiment, a controller or application specific integrated circuit (ASIC) for the pointing device can also be integrated on the same semiconductor chip as the photosensor. This further reduces the part count by combining these two chips into one.

In an additional embodiment, a set of (2–4) light pipes can be used to direct light to a third group of photodetectors on the semiconductor chip, thus eliminating another photosensor chip. The proper implementation of light pipes requires at least one light pipe per each light sensitive area. The third group of photodetectors could be used to detect light directed at an encoder wheel connected to a roller for scrolling. Alternately, light could be used to detect the depression of a button, rather than the microswitch. Thus, one or more light pipes can connect to multiple sensors on the same chip. As used herein, the terms "sensor" or a "photo sensor" terms "detector" or "photodetector." Also the term "sensor" is intended to refer to a single sensor and or a group of sensors.

For further understanding of the nature and advantages of the invention, reference should be made to the following description taken in conjunction with the accompanying drawings.

DESCRIPTION OF THE SPECIFIC EMBODIMENTS

Figure 1:
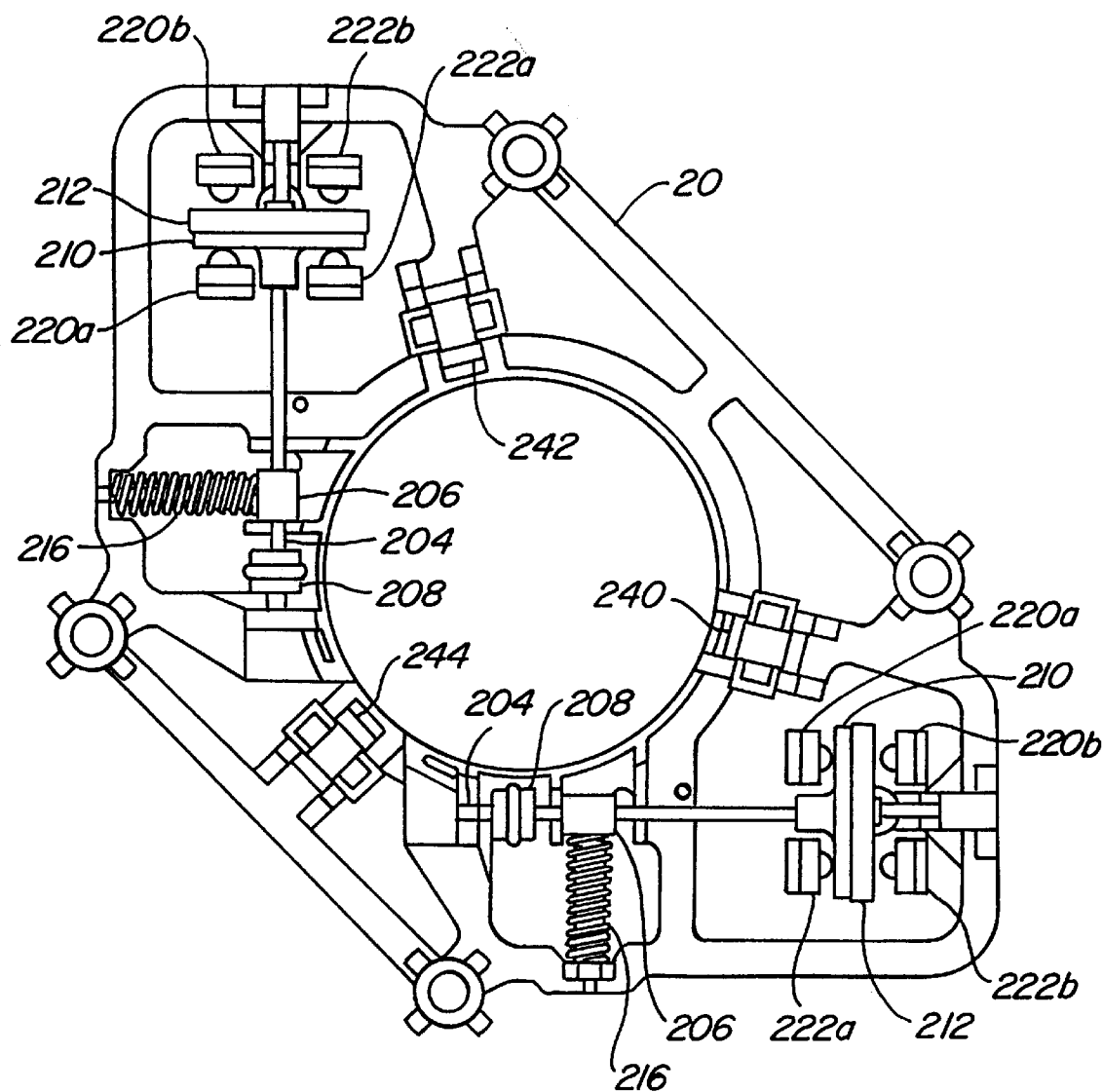
FIG. 1 is a diagram of a prior art mouse design illustrating the use of rollers and encoder wheels.

FIG. 1 is a diagram of an older prior art design for trackball components. A similar design, with respect to areas of interest in this application, is used for a mouse. As will be discussed below, current designs typically eliminate a number of the components set forth in FIG. 1.

Referring to FIG. 1, the skeleton 20 of a trackball is shown in plan view. Mounted on the skeleton are all of the mechanical elements of a pair of optomechanical encoders. The mechanical elements of each encoder include a shaft 204 mounted within a positioner 206 and an engagement wheel 208. Mounted on the shaft is an encoding wheel 210, which has slits in it for the selective passage of light.

The shaft 204 passes through a mask 212, which permits the mask to be juxtaposed next to the encoding wheel 210. The mask 212 may be seen to include slits, opposed at a suitable angle. A post on the mask 212 engages a receiver on the skeleton 20, which serves to position rotatably one end of the shaft 204. The other end of the shaft 204, bearing the engagement wheel 208, is retained within a slotted receiver (another of which also limits the range of movement of the other end of the shaft 204). The engagement wheel is urged into frictional contact with the ball by means of spring 216, which extends between a positioning pin 206 on the shaft 204 and an opposing positioning pin on the skeleton 20.

The encoding wheel 210 and mask 212 are positioned between a pair of photo sources and photodetectors 220a–b and 222a–b, which are affixed to a printed circuit board. The movement of the ball in engagement with the wheels 208 causes the encoding wheel 210 to rotate relative to the fixed slits in the mask 212, so that the photodetectors 220b and 222b generate a quadrature signal, which may be readily converted to a digital signal indicative of movements by a manner well known in the art.

In a trackball configuration, to ensure smooth rotation of the ball, three support rollers 240, 242 and 244 are provided. The rollers 240–244 may be of the shaft-mounted ball bearing type, and provide improved shock loading. The ball rests on the rollers 240–244, and thus does not frictionally engage the opening in the skeleton 20. Additionally to reduce costs, small hard balls of steel, ceramic, ruby or similar material can be used as ball supports. In other embodiments, however, where such shock loading is not required, it may be desirable to eliminate the support rollers 240–244 and to permit direct engagement of the ball with the skeleton 20.

As noted above in connection with the photo sources and photodetectors 220a–b, the skeleton 20, once assembled, is located over the printed circuit board assembly. The PCB, in addition to holding the photo sources and photodetectors also supports a connector by which the trackball may be electronically connected to a personal computer or workstation (not shown). The PCB may also hold a suitable processor or other electronics to manipulate the quadrature signals generated by the photodetectors 220b and 222b. A suitable sensing circuit is used.

In mice, the three support rollers are replaced by a single pressure roller opposite a mid-point of the two encoder rollers. In more modern designs, the masks are typically eliminated, instead using dual or quad photodetectors for differential detection (see, for example, U.S. Pat. No. 5,680,157, incorporated herein by reference). In addition, instead of using the skeleton 20, the support structures may be integrated into the bottom housing of the trackball or mouse (see, for example, U.S. Pat. No. 5,670,990). All of these innovations have contributed to the reduction of components and reduction of costs of mice, trackballs, and other pointing devices.

Figure 2:
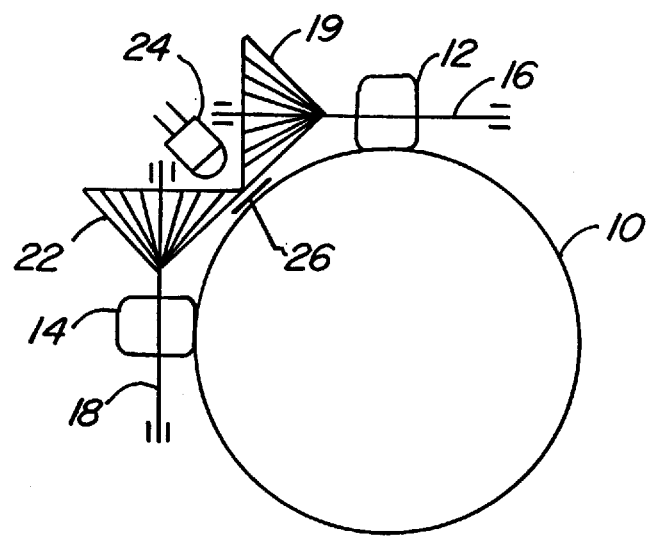
FIG. 2 is a diagram illustrating the use of the transmissive encoding system.

FIG. 2 is a diagram of one embodiment of the present invention. A trackball or mouseball 10 is shown, with two rollers 12 and 14 biased against it, and offset from each other by an angle of 90°. The rollers are connected to shafts 16 and 18, respectively. The ends of the shafts are connected to encoder wheels 19 and 22, respectively. Although the angle between the rollers contact point is 90 degrees, it is possible to have a different value, for example 120 degrees. The advantage of the 120 degree system is more available space for the encoder wheels and a better balanced configuration for the three rollers in contact with the ball. The drawback is that the x and y movements are no longer directly detected by the encoding wheels. Therefore, a coordinate translation would have to be performed, but such a conversion is quite uncomplicated.

Each of the encoder wheels, instead of being a disk, is cone-shaped. This conical shape allows the placement of a light emitting diode 24 at a position where light from it will pass through portions of both cones. On the opposite side of the cones from the light emitting diode is a photodetector chip 26.

Figure 3:
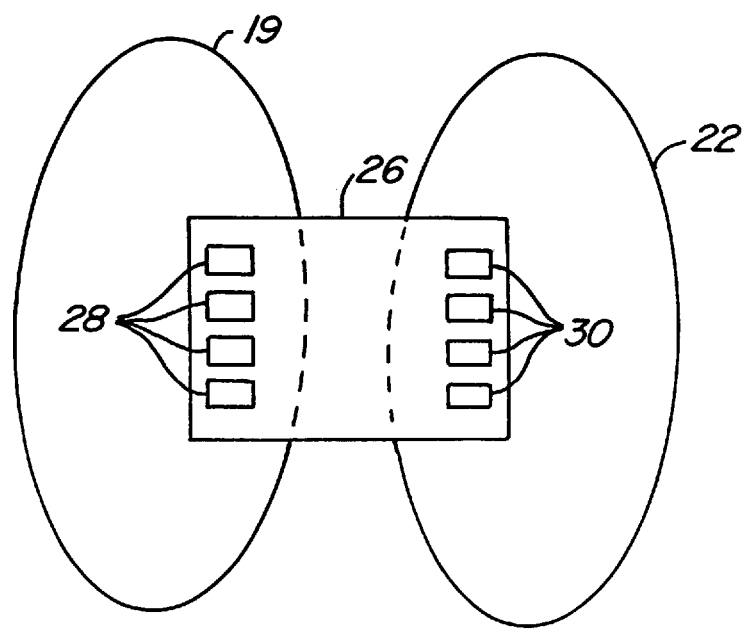
FIG. 3 is a diagram illustrating the positioning of two groups of photosensors behind the conical encoders of FIG. 2.

FIG. 3 illustrates the positioning of semiconductor chip 26 in more detail. As can be seen, a quad photosensor having four light sensitive areas 28 is positioned opposite conical encoder 19. Similarly, a quad photosensor having four light sensitive areas 30 is positioned opposite conical encoder 22. Alternately, a dual or other photodetector configuration could be used. As described above, as used herein, the term "sensor" or a "photo sensor" are synonymous with the terms "detector" or a "photodetector." Also the term "sensor" is intended to refer to a single sensor and or a group of sensors. Moreover each photodetector can be made of two light sensitive areas. The distance between these areas is such that the phase difference of the generated signal is 90 degrees. Alternately, each photodetector may be made of three or more light sensitive areas connected to comparators and adequately spaced to generate 90 degrees out of phase signals as described in U.S. Pat. No. 5,680,157, entitled Pointing Device with Differential Optomechanical Sensing and assigned to the assignee of the present invention, and incorporated herein by reference.

The conical encoder wheels can be slotted disks, like the prior art, which are formed in a cone shape of plastic. As shown, preferably the cones have an angle of 45°, such that the two sides of the cone form a tangent to ball 10, and are also tangent to the vertically aligned photosensor chip 26. However, this is not necessary, and other angles could be used as well. As used herein, the term "conical" is intended to refer to any curved shape which is not a flat slotted disk.

In one embodiment, the conical encoders can be made up of a transparent structure that concentrates the light from the LED in some areas, and removes it in others. Thus, a pattern similar to that which is obtained from a classical slotted disk can be produced. Any type of transparent material could be used for the conical encoder, such as Polycarbonate, for example. In one embodiment, the conical disk and it's shaft are molded as a single piece of the same material.

Figure 2A:
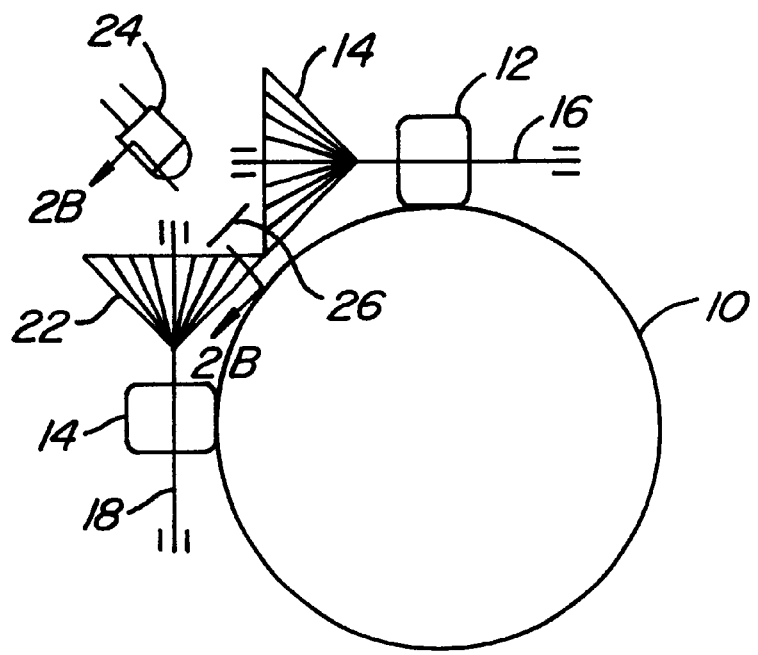
FIG. 2A is a diagram illustrating the use of the reflective encoding system.

In another embodiment, an encoding system based on a reflective scheme, as opposed to the above discussed transmissive encoding schemes, is used. In the transmissive schemes, the encoder disk is placed in between the LED and the light detector. The encoder disk, in these transmissive schemes, allows for the light from the LED to pass through the disk to the detector. The portions of the light that are passed and blocked are then detected by the photodetector located on the other side of the detector chip. In the reflective scheme, the light directed at the encoder disk is selectively reflected, as opposed to selectively transmitted, towards the photodetector placed on the same side of the encoder as the LED, as shown in FIG. 2A. The fundamental principle of reflection is that the reflected angle is equal to the incidence angle. It is preferred to have these angles be as close as possible to the normal to the plane of the reflection, however perfectly normal is not possible because the two packages of the photo emitter and the photodetector cannot overlap. Usually a thin shielding wall is placed in-between to prevent interference. Additionally, the reflective surface can be flat, however it is preferred to have a curved surface so that the light is focused on the sensor with higher efficiency.

FIG. 2A is an embodiment of the present invention using a reflective encoding scheme. A trackball or mouseball 10 is shown, with two rollers 12 and 14 biased against it at 90° from each other. The rollers are connected to shafts 16 and 18 respectively. The ends of the shaft are connected to encoder wheels 19 and 22, respectively.

Figure 2B:
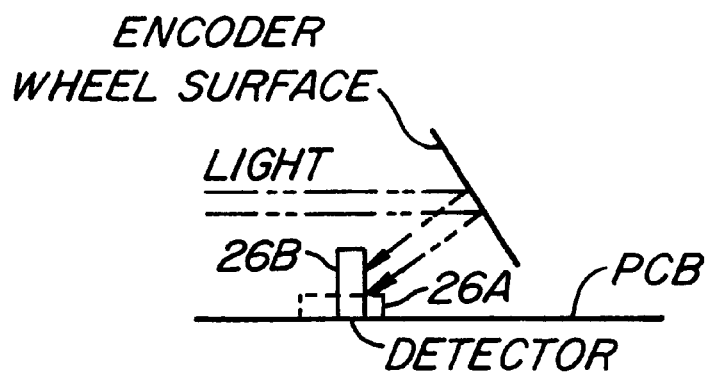
FIG. 2B is a diagram of a cross section view from FIG. 2A.

Each of the encoder wheels is cone-shaped. This conical shape allows the placement of the light emitting diode 24 at a position where the light from it strikes portions of both cones. The photodetector chip 26 is placed on the same side of the encoder cones as the LED. In the embodiments shown in FIG. 2B, the detector can be placed in the vertical plane 26B on the PCB, tangent to both conical shaped encoders, or it can be mounted horizontally flat 26A on the PCB, or it can be mounted at any angle ranging from horizontally flat to vertical on the PCB, or at any angle in this range relative to the reflected light to adequately receive the reflected light. There are also several ways to implement the reflective surface of the encoder disks, some using real mirrors, and others using total internal reflection. If mounted vertically, the back of the photodetector faces the LED, so no direct light will hit the photodetector. If mounted horizontally flat, the LED is placed high enough so no direct light reaches the photodetector, or a shield is placed behind the photodetector to prevent direct light from reaching it.

In the reflective embodiment, it may be preferential to use the reflective shape of the encoder disks to concentrate the light. This may be useful to accommodate the potentially larger distance between the light modulating surface and the sensor. The simple (non-concentrating) light modulating surface is preferred where the distance between the light modulating surface and the sensor is very small. As this distance is increased, it is preferred to concentrate the light coming from the light modulating surface to ensure the adequate sensing of the light by the light sensor. The incorporation of a light concentrating modulating surface can also be beneficial to a transmissive embodiment.

Figure 4:
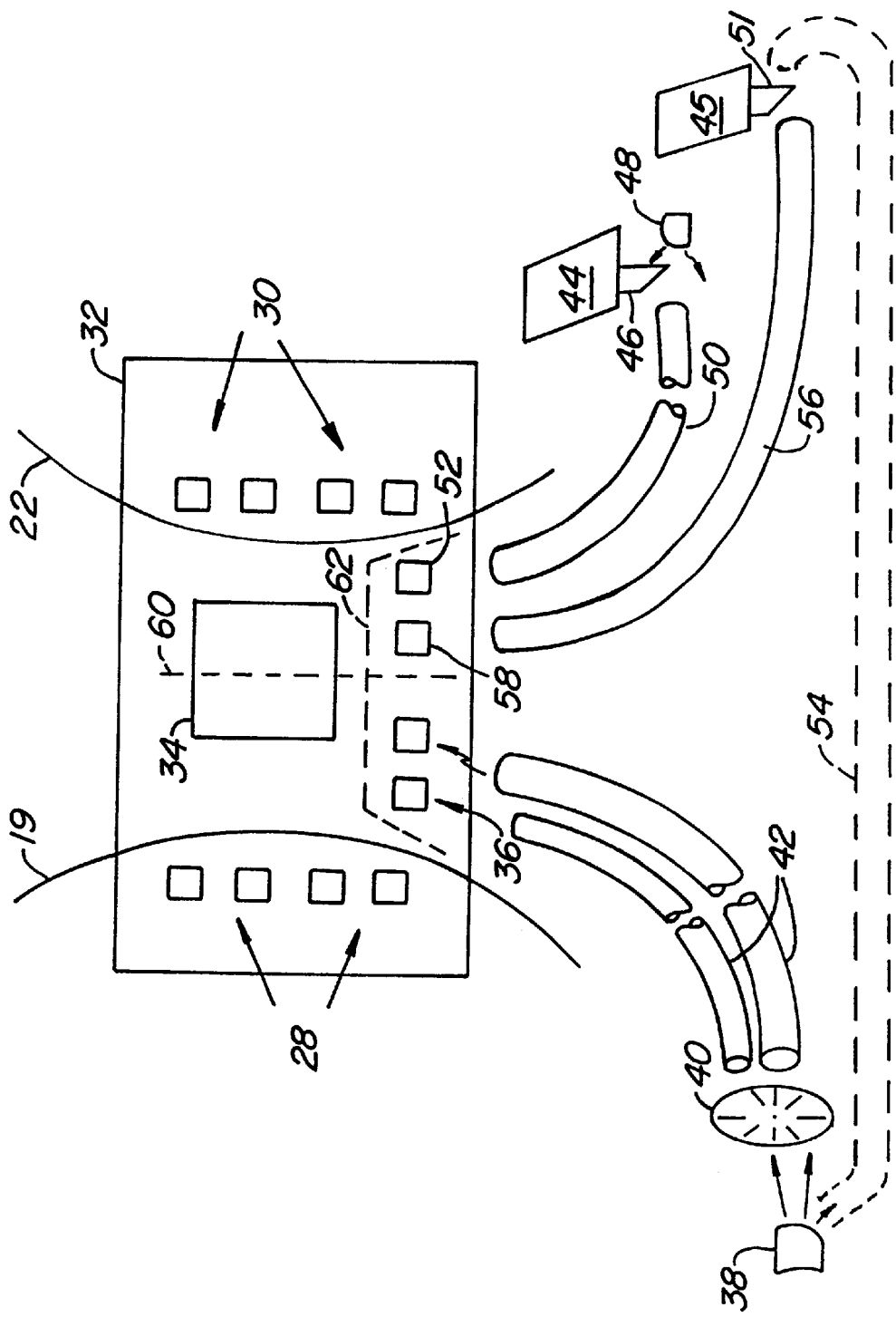
FIG. 4 is a diagram illustrating the use of light pipes in an alternate embodiment of the invention.

FIG. 4 illustrates an alternate embodiment of the invention in which a sensor chip 32 includes photosensors 28 and 30, but also includes a controller circuit 34. Controller circuit 34 can be a microprocessor, a controller, or an ASIC used for controlling functions of the pointing device. By grouping the sensors and the controller on the same chip, not only is there less space required for components, and fewer components (fewer chips), but also less interconnection is needed. For example, the output buffers and pads normally on a separate sensor chip are eliminated, as well as the input pads and protection circuits normally on a controller chip which connects to the sensor chips.

FIG. 4 also shows a separate set of photosensors 36. A separate LED 38 may provide light through an encoder wheel 40 connected to a roller for scrolling, for instance. On the other side of encoder wheel 40 is a group of 2 to 4 lightpipes 42, which provides the light to sensors 36. Thus, for functional purposes, it's as if the sensors 36 are physically on the opposite side of encoder wheel 40, as in existing devices. This thus allows the elimination of another photosensor chip in the design. The proper implementation of light pipes, requires at least one light pipe per each light sensitive area.

In yet another alternate embodiment, two buttons 44 and 45 are shown. Button 44 has a fin 46 which extends below it, and normally does not block light generated by an LED 48 and received by lightpipe 50, and transmitted to a sensor 52 on chip 32. When button 44 is depressed, however, fin 46 blocks the light from LED 48, providing a dark image to photosensor 52, which then can detect a button depression.

A similar method can be used for button 45 with its fin 51. Alternately, instead of a separate LED, an additional lightpipe 54 providing the light from either LED 48 or LED 38 can be used. Lightpipe 54 could be Y-shaped to provide light to a second location. Fin 51 similarly will block the light, which is received by lightpipe 56 and is provided to a sensor 58 on semiconductor chip 32. In one embodiment, sensor 58 is a dual sensor to make the design less sensitive to component variation and provide a more precise switching point.

Alternately, a single LED or other light emitter could be used for the entire pointing device, with one or more lightpipes directing that light to the various encoder wheels where it is needed, or to the button fins.

In yet another alternate embodiment, shunt barriers 60, 62 indicated by dotted lines on photosensor chip 32, could be placed to avoid light from one lightpipe or from LED 38 impinging on the wrong photosensors. Shunt barriers 60, 62 could simply be a piece of opaque plastic which protrudes slightly from the surface of the chip, and is simply glued onto the surface of the chip or mounted adjacent to it. Shunt barriers 60, 62 could be formed integral with the lower housing of the mouse or trackball, for example. Alternately, shunt barrier 60, 62 could be replaced with a simple vertical piece of plastic which has holes at the appropriate position for light to penetrate to the desired photodetectors. Thus, it would block most of the area of chip 32, but have openings above sensors 30 and 28, for example.

As will be understood by those of skill in the art, the present invention may be embodied in other specific forms without parting from the essential characteristics thereof. For example, the conical encoders, instead of having a straight edge, could be curved, to have the shape more like that of a half sphere. Alternately, other shapes could be used. In addition, instead of using a spring-biased pressure roller, the shafts of the conical disks could be spring-biased against the ball, with the pressure roller instead being fixed. Accordingly, the foregoing disclosure is intended to be illustrative, but not limiting, of the scope of the invention which is set forth in the following claims.

What is claimed is:

1. An input device having a movable ball and having two rollers biased against said ball, comprising:
   a first conical shaped encoder connected to said first roller;
   a second conical shaped encoder connected to said second roller;
   a light emitter located adjacent to and directing light at said first and second encoders; and
   first and second light sensors mounted on a single semiconductor chip, and positioned such that light from said light emitter is directed at and interacts with said first encoder, and is received by first sensor, and directed at and interacting with said second encoder and is received by said second sensor.

2. The input device of claim 1 wherein said encoders alternately block and let light pass through as they rotate with said respective roller.

3. The input device of claim 1 wherein said encoders selectively reflect light as they rotate with said respective roller.

4. The input device of claim 1 wherein said single semiconductor chip is mounted in a vertical plane tangent to both said conical shaped encoders.

5. The input device of claim 1 wherein said single semiconductor chip is mounted in one of a range of positions from horizontally flat to vertical on a printed circuit board (PCB).

6. The input device of claim 1 wherein said first and second rollers contact said ball at two points 90 degrees apart.

7. The input device of claim 1 wherein said conical shaped encoders are conical with an angle of 45 degrees from a shaft connecting each to a respective one of said first and second rollers.

8. The input device of claim 1 further comprising a controller for said input device mounted on said semiconductor chip with said light sensors.

9. The input device of claim 1 wherein said encoders comprise light modulating structures configured to concentrate light from said light emitter in some areas and remove it from other areas.

10. The input device of claim 1 wherein said encoders comprise reflective structures configured to selectively reflect light from said light emitter towards said sensors.

11. The input device of claim 10 wherein said reflective structures are comprised of real mirrors.

12. The input device of claim 10 wherein said reflective structure's function is achieved using total internal reflection.

13. The input device of claim 1 wherein said semiconductor chip is mounted on a flexible transparent foil, with the foil having conductive traces on a side having said chip mounted thereon, with light from said light emitter penetrating said foil to contact said light sensors.

14. The input device of claim 1 further comprising:
   a third sensor on said semiconductor chip;
   and a light pipe directing light from another control input to said third sensor.

15. The input device of claim 14 wherein said third sensor comprises a roller coupled to a third encoder, said light pipe originating on a side of said third encoder opposite a second light source.

16. The input device of claim 9 wherein said third sensor comprises a switch activatable by a button on said input device.

17. The input device of claim 1 wherein said input device comprises a mouse.

18. The input device of claim 1 wherein said input device comprises a trackball.

19. An input device having a movable ball and having two rollers biased against said ball, comprising:
   a first conical shaped encoder connected to said first roller;
   a second conical shaped encoder connected to said second roller;
   a light emitter placed to direct light at said first and second encoders;
   first and second light sensors mounted on a single semiconductor chip located adjacent to said first and second encoders, and positioned such that light from said light emitter is directed at and interacts with said first encoder and is received by said first sensor, and directed at and interacting with said second encoder and is received by said second sensor;
   wherein said encoders alternately block and let light pass through as they rotate with said respective roller;
   wherein said single semiconductor chip is mounted in a vertical plane tangent to both said conical shaped encoders;
   wherein said first and second rollers contact said ball at two points 90 degrees apart; and
   wherein said conical shaped encoders are conical with an angle of 45 degrees from a shaft connecting each to a respective one of said first and second rollers.

20. An input device having a movable ball and having two rollers biased against said ball, comprising:
   a first conical shaped encoder connected to said first roller;
   a second conical shaped encoder connected to said second roller;
   a light emitter placed to direct light at said first and second encoders;
   first and second light sensors mounted on a single semiconductor chip located adjacent to said first and second encoders, and positioned such that light from said light emitter is directed at and interacts with said first encoder and is received by said first sensor, and directed at and interacting with said second encoder and is received by said second sensor;
   wherein said encoders comprise reflective structures configured to selectively reflect light from said light emitter towards said sensors;
   wherein said single semiconductor chip is mounted in a position ranging from horizontally flat to a vertical plane tangent to both said conical shaped encoders, at an angle in said range relative to said reflected light;
   wherein said first and second rollers contact said ball at two points 90 degrees apart; and
   wherein said conical shaped encoders are conical with an angle of 45 degrees from a shaft connecting each to a respective one of said first and second rollers.

21. The input device of claim 19 or 20 further comprising first and second springs biasing said rollers against said movable ball.

* * * * *